United States Patent [19]

Sanok et al.

[11] 4,242,463
[45] Dec. 30, 1980

[54] COLOR STABLE INTEGRAL SKIN FOAM

[75] Inventors: John L. Sanok, Wyandotte; Albert F. Reilly, Howell, both of Mich.

[73] Assignee: Sheller-Globe Corporation, Toledo, Ohio

[21] Appl. No.: 105,379

[22] Filed: Dec. 19, 1979

[51] Int. Cl.³ .................... C08G 18/14; C08G 18/24; C08G 18/75
[52] U.S. Cl. ................. 521/51; 260/37 N; 521/126; 521/127
[58] Field of Search .................. 521/51, 126, 127

[56] References Cited

U.S. PATENT DOCUMENTS

| | | | |
|---|---|---|---|
| 3,182,104 | 5/1965 | Civik | 264/45 |
| 3,392,153 | 7/1968 | Hostettler et al. | 260/77.5 |
| 3,422,036 | 1/1969 | Ellegast et al. | 260/2.5 |
| 3,441,523 | 4/1969 | Dwyer et al. | 260/2.5 |
| 3,473,951 | 10/1969 | De Rossi et al. | 117/72 |
| 3,476,933 | 11/1969 | Mendelsohn | 260/2.5 |
| 3,645,924 | 2/1972 | Fogiel | 260/2.5 AC |
| 3,655,597 | 4/1972 | Strassel | 260/2.5 AZ |
| 3,769,244 | 10/1973 | Hashimoto et al. | 260/2.5 AC |
| 3,775,350 | 11/1973 | Juhas | 260/2.5 AZ |
| 3,814,707 | 6/1974 | Moeller et al. | 260/2.5 AC |
| 3,925,526 | 12/1975 | Haas | 264/45.5 |
| 3,993,608 | 11/1976 | Wells | 260/2.5 AW |
| 4,006,124 | 2/1977 | Welte et al. | 260/77.5 AC |
| 4,025,466 | 5/1977 | Jourquin et al. | 260/2.5 AC |
| 4,065,410 | 12/1977 | Schaefer et al. | 260/2.5 AM |
| 4,150,206 | 4/1979 | Jourquin et al. | 521/51 |
| 4,189,542 | 2/1980 | Kleimann et al. | 521/124 |

FOREIGN PATENT DOCUMENTS

| | | |
|---|---|---|
| 580788 | 8/1959 | Canada . |
| 852646 | 9/1970 | Canada . |
| 854251 | 10/1970 | Canada . |
| 854252 | 10/1970 | Canada . |
| 854253 | 10/1970 | Canada . |
| 43640 | 1/1943 | Japan . |
| 891007 | 3/1962 | United Kingdom . |
| 900392 | 7/1962 | United Kingdom . |
| 1009965 | 11/1965 | United Kingdom . |

*Primary Examiner*—H. S. Cockeram
*Attorney, Agent, or Firm*—Harness, Dickey & Pierce

[57] ABSTRACT

This disclosure relates to a new color stable integral skin polyurethane foam and method of producing the same wherein an integral skin foam is provided which will not "yellow" or change color severely when exposed to ultraviolet light or other visible radiation. The foam composition in its most basic aspect involves the combination of a polyol, an isocyanate, and a crosslinker or chainextender, with a catalyst comprised of stannous octoate and dimethyltin dilaurate. Other ingredients such as a blowing agent, a pigment, an ultraviolet stabilizer, an anti-oxidant, and an anti-ozonant may be added depending upon the final properties desired.

34 Claims, No Drawings

COLOR STABLE INTEGRAL SKIN FOAM

BACKGROUND OF THE INVENTION

The present invention pertains primarily to integral skin foams, and more particularly to color or light stable integral skin polyurethane foams.

The following cited references are believed to be representative of the state of the art:

| U.S. Pat. No. | Inventor(s) | Issued |
|---|---|---|
| 3,182,104 | Civik | May 4, 1965 |
| 3,422,036 | Ellegast et al | January 14, 1969 |
| 3,473,951 | De Rossi et al | October 21, 1969 |
| 3,476,933 | Mendelsohn | November 4, 1969 |
| 3,645,924 | Fogiel | February 29, 1972 |
| 3,655,597 | Strassel | April 11, 1972 |
| 3,769,244 | Hashimoto | October 30, 1973 |
| 3,775,350 | Juhas | November 27, 1973 |
| 3,814,707 | Moller | June 4, 1974 |
| 3,925,526 | Haas | December 9, 1975 |
| 3,993,608 | Wells | November 23, 1976 |
| 4,006,124 | Welte et al | February 1, 1977 |
| 4,025,466 | Jourquin et al | May 24, 1977 |
| 4,150,206 | Jourquin et al | April 17, 1979 |

Canadian Patent No. 580,788 to Parker et al, issued August 4, 1959.

| United Kingdom Patent No. | Inventor(s) | Issued |
|---|---|---|
| 891,007 | Lowe et al | March 7, 1962 |
| 900,392 | Cowdrey et al | July 4, 1962 |
| 1,009,965 | — | November 17, 1965 |

Generally, integral skin polyurethane foam is used on articles which must be elastic, flexible, relatively impermeable, have good resistance to tear and plastic deformation, a compact surface or skin, and a cellular internal structure. Typical of such articles are many of the parts used in automobiles such as arm rests, crash pad covers, and steering wheels. The one step molding operation for integral skin polyurethane foam replaced to some extent the two step process in which a separate skin was first molded, and then a non-skinning urethane foam was molded inside the skin to form the finished product.

The surface or skin of an integral skin foam article comprises a substantially nonexpanded elastomer layer which is both compact and impervious, while internally, the article comprises a flexible and elastic cellular mass forming a protective padding which provides insulation against shocks and vibrations. For example, a steering wheel comprising integral skin urethane foam would have a skin that may have the appearance of leather, have a pleasant feel, be relatively resilient when handled, provide vibration absorption and thermal isolation, and also be somewhat flexible in the event of an accident.

Originally, most integral skin polyurethane foam parts were produced in just a few colors, namely black, brown, or gray; and then if some other surface color was desired, the part would be painted. However, painted wheels are considerably more expensive to produce than unpainted wheels for reasons that should be readily apparent. Further, there is very often some problem with paint adhesion and paint wear in actual use due to abrasion and other effects of repeated handling. As a result of these problems, efforts have been directed at producing integrally colored integral skin foam parts, that is, parts in which the color is molded right into the part so that the entire part bears the same color inside and out.

Normal integral skin polyurethane foams, because of the presence of aromatic diisocyanates in the reacting mixture, have poor color stability and usually will yellow severely when exposed to ultraviolet light or other visible radiation. Efforts at preparing such foams using aliphatic diisocyanates have met with rather limited success since although the foams produced are relatively color stable, they are slow reacting and thus are difficult to incorporate into commercial manufacturing processes and also are economically unattractive or prohibitive.

It is a principal object of the present invention therefore to provide a color stable integral skin polyurethane foam.

Another object of the present invention is to provide a color stable integral skin foam formulation which uses aliphatic diisocyanates and which reacts at a reasonable rate.

It is thus a further object of the present invention to provide a foam which because of its reasonable reaction rate is economically attractive to produce. Other objects, features and advantages of the present invention will become apparent from the subsequent description and examples, and the appended claims.

SUMMARY OF THE INVENTION

In accordance with the present invention, a color stable integral skin foam and method of producing the same are provided wherein stannous octoate and dimethyltin dilaurate are used as catalysts to drive the urethane or urea reaction between the hydroxyl or amine and the alphatic or cyclo-aliphatic isocyanate. The particular ingredients in the composition used to make the foam, such as the specific polyol, specific aliphatic or cyclo-aliphatic isocyanate, and specific crosslinker should be a relatively simple matter of choice for one skilled in this art. Also, the addition of optional ingredients such as blowing agents, pigments, ultraviolet absorbers, anti-oxidants, anti-ozonants, and the like are left to the discretion of one skilled in the art.

The use of stannous octoate and dimethyltin dilaurate (DMTDL) as an effective catalyst to produce color stable integral skin foam at a reasonable reaction velocity has proven to be very surprising and unexpected, especially in view of the fact that a combination of the same stannous octoate with dibutyltin dilaurate (DBTDL), an adjacent homolog of DMTDL, does not sufficiently catalyze a reaction with aliphatic isocyanates. Further evidence of this surprising result is found in the fact that both DMTDL and DBTDL are used as catalysts for aromatic isocyanates, whereas only the former works satisfactorily with aliphatic or cyclo-aliphatic isocyanates.

The composition used to prepare the color stable integral skin polyurethane foam of the present invention may be comprised of the following main ingredients:

The polyol used in the invention should be selected from the group of polyether polyols, which are polymer products of organic oxides. An active hydrogen compound such as a glycol, acid, or amine serves as an initiator for the oxide polymerization. The two organic oxides used for most polyether polyols are ethylene oxide and propylene oxide. In particular, it has been found that such materials as Pluracol Polyol 380, 538, 581, and 816 (manufactured by BASF-Wyandotte Corp.) perform satisfactorily. The amount of polyol should broadly be present within the range of between about 40 to about 80 percent by weight of the composition, and preferably should be between about 50 to about 70 percent by weight of the composition, with best results being obtained within the range of about 50 to about 60 percent by weight of the composition.

The isocyanate utilized in accordance with the present invention should be selected from the group consisting of aliphatic or cyclo-aliphatic isocyanates. In particular, such materials as DuPont Hylene-W, a saturated aliphatic isocyanate; Desmodur W, a hydrogenated MDI manufactured by Mobay Chemical Co.; IPDI, an isophorone diisocyanate manufactured by Veba-Chemie AG; and xylene diisocyanate have been found to perform satisfactorily. The amount of isocyanate should broadly be present within the range of between about 10 to about 40 percent by weight of the composition, and preferably should be between about 15 to about 35 percent by weight of the composition, with best results being obtained within the range of about 20 to about 30 percent by weight of the composition.

The crosslinker or chainextender used in the present invention should generally be a short chain polyol or polyamine having an equivalent weight of between about 30 and about 90. It has been found that ethylene glycol; 1, 4-butanediol; glycerine; and diproplylene glycol all perform satisfactorily. The amount of crosslinker or chainextender should broadly be present within the range of between about 2 to about 10 percent by weight of the composition, and preferably should be between about 3 to about 7 percent by weight of the composition, with best results being obtained within the range of about 4 to about 6 percent by weight of the composition.

The catalyst utilized in the present invention comprises stannous octoate in combination with dimethyltin dilaurate, with M & T Chemicals Inc. T-9 stannous octoate and Witco Chemical Co. UL-28 dimethyltin dilaurate (DMTDL) being found to perform satisfactorily. The catalyst may comprise equal parts of stannous octoate and DMTDL and should broadly be present within the range of between about 1 to about 5 percent by weight of the composition, and preferably should be between about 2 to about 4 percent by weight of the composition, with best results being obtained within the range of about 3 to about 4 percent by weight of the composition.

In addition to the above ingredients, the following materials may also be present in the integral skin polyurethane foam composition and method of the present invention:

A blowing agent such as E. I. DuPont deNemours Chemical Co. F-11B, trichloro-fluoromethane (Freon), performs satisfactorily. It may be broadly present within the range of between about 5 to about 15 percent by weight of the composition, and preferably should be between about 8 to about 13 percent by weight of the composition, with best results being obtained within the range of about 9 to about 12 percent by weight of the composition.

With regard to pigments which may be used in the composition and method of the present invention, any commercially available pigment compatible with polyurethane ingredients should be acceptable. Verona Red, Verona Green 609, and Verona Blue pigments such as those available from Mobay Chemical Co. have been found to be satisfactory. Although the amount of pigment used is generally related to the intensity of the desired color, it has been found that the pigment should be broadly present within the range of between about 1 to about 4 percent by weight of the composition, with best results being obtained within the range of about 2 to about 4 percent by weight of the composition.

It has surprisingly been found that long term stability of the foam produced in accordance with the present invention can be enhanced by including a small amount of UV stabilizer and anti-oxidant in the composition. A UV stabilizer such as Tinuvin 327, 328, or 777 as supplied by Ciba-Geigy Corp., and an anti-oxidant such as Irganox 1010 also supplied by Ciba-Geigy Corp. have been found to so enhance the performance of the foam of the present invention after exposure to ultraviolet, Weatherometer, and Fadeometer tests. These materials should both be broadly present within the range of between about 0.5 to about 3 percent by weight of the composition, with results being obtained within the range of about 1 to about 2 percent by weight of the composition.

An anti-ozonant may also be used in the present invention. The Irganox 1010 material referred to above has also been found to function well as an anti-ozonant in the quantities referred to above. Thus, the use of between about 0.5 to about 3 percent by weight of this particular material provides both anti-oxidant and anti-ozonant properties with best results being obtained within the range of about 1 to about 2 percent by weight of the composition.

In order to further illustrate the invention, the following examples are provided. It is to be understood, however, that the examples are included for illustrative purposes only and are not intended to be limiting of the scope of the invention as set forth in the subjoined claims.

EXAMPLE 1

| Ingredient | Parts |
| --- | --- |
| Pluracol 581 | 100 |
| Ethylene Glycol | 12.0 |
| T-9 | 3.0 |
| UL-28 | 3.0 |
| F-11B | 20.0 |
| Tinuvin 328 | 1.0 |
| Irganox 1010 | 1.0 |
| Hylene-W | 43.9 per 100 parts of above resin mixture |

| Physical Test | Results |
| --- | --- |
| Tensile, psi | 950 |
| Elongation, % | 100 |
| Hardness, Shore A | 70 |
| Tear, ppi (w/skin) | — |
| Tear, ppi (no skin) | 7.4 |
| Compression Set, % | 24.5 |
| U.V. - 250 hours | 1* |
| Weatherometer - 250 hours | 1* |
| Fadeometer - 250 hours | 1* |

*The following subjective ratings were used for the U.V. Weatherometer, and Fadeometer tests:
1-No cracks, negligible discoloration
2-No cracks but more discoloration than #1 rating
3-Some cracks and discoloration
4-Cracked, crumbled, broken, and/or badly discolored

EXAMPLE 2

| Ingredient | Parts |
|---|---|
| Pluracol 581 | 100 |
| Ethylene Glycol | 14.0 |
| T-9 | 3.0 |
| UL-28 | 3.0 |
| F-11B | 20.0 |
| Tinuvin 328 | 1.0 |
| Irganox 1010 | 1.0 |
| Hylene-W | 48.9 per 100 parts of above resin mixture |

| Physical Test | Results |
|---|---|
| Tensile, psi | 820 |
| Elongation, % | 110 |
| Hardness, Shore A | 71 |
| Tear, ppi (w/skin) | — |
| Tear, ppi (no skin) | 9.1 |
| Compression Set, % | 23.8 |
| U.V. - 250 hours | 1 |
| Weatherometer - 250 hours | 1 |
| Fadeometer - 250 hours | 1 |

EXAMPLE 3

| Ingredient | Parts |
|---|---|
| Pluracol 380 | 100.0 |
| Ethylene Glycol | 10.0 |
| T-9 | 3.0 |
| UL-28 | 3.0 |
| Tinuvin 328 | 1.0 |
| F-11B | 20.0 |
| Hylene-W | 37.1 per 100 parts of above resin mixture |

| Physical Test | Results |
|---|---|
| Tensile, psi | 520 |
| Elongation, % | 185 |
| Hardness, Shore A | 40 |
| Tear, ppi (w/skin) | 7.2 |
| Tear, ppi (no skin) | 7.0 |
| Compression set, % | 13.1 |
| U.V. - 250 hours | 1 |
| Weatherometer - 250 hours | 1 |
| Fadeometer - 250 hours | 2 |

EXAMPLE 4

| Ingredient | Parts |
|---|---|
| Pluracol 380 | 100.0 |
| 1,4-Butanediol | 10.0 |
| T-9 | 3.0 |
| UL-28 | 3.0 |
| Irganox 1010 | 1.0 |
| F-11B | 20.0 |
| Hylene-W | 27.0 per 100 parts of above resin mixture |

| Physical Test | Results |
|---|---|
| Tensile, psi | 390 |
| Elongation, % | 165 |
| Hardness, Shore A | 69 |
| Tear, ppi (w/skin) | 9.9 |
| Tear, ppi (no/skin) | 6.7 |
| Compression set, % | 8.7 |
| U.V. - 250 hours | 1 |
| Weatherometer - 250 hours | 1 |
| Fadeometer - 250 hours | 3 |

EXAMPLE 5

| Ingredient | Parts |
|---|---|
| Pluracol 380 | 100.0 |
| Ethylene Glycol | 8.0 |
| UL-28 | 3.0 |
| T-9 | 3.0 |
| F-11B | 20.0 |
| Verona Red | 1.0 |
| Isocyanate (comprised of 42.9 parts Dipropylene glycol and 957.1 parts Hylene-W) | 34.1 per 100 parts of above resin mixture |

| Physical Test | Results |
|---|---|
| Tensile, psi | 340 |
| Elongation, % | 290 |
| Block Tear, ppi (no skin) | 6.0 |
| Block Tear, ppi (with skin) | 7.9 |
| Compression Set, % | 54.9 |
| U.V. - 250 hours | 3 |
| Weatherometer - 250 hours | 3 |
| Fadeometer - 250 hours | 3 |

EXAMPLE 6

| Ingredient | Parts |
|---|---|
| Pluracol 380 | 100.0 |
| Ethylene Glycol | 8.0 |
| UL-28 | 3.0 |
| T-9 | 3.0 |
| F-11B | 20.0 |
| Verona Red | 1.0 |
| Isocyanate (comprised of 72.9 parts Dipropylene glycol and 927.1 parts Hylene-W) | 37.9 per 100 parts of above resin mixture |

| Physical Test | Results |
|---|---|
| Tensile, psi | 360 |
| Elongation, % | 270 |
| Block Tear, ppi (no skin) | 6.6 |
| Block Tear, ppi (with skin) | 8.8 |
| Compression Set, % | 73.1 |
| U.V. - 250 hours | 3 |
| Weatherometer - 250 hours | 3 |
| Fadeometer - 250 hours | 3 |

EXAMPLE 7

| Ingredient | Parts |
|---|---|
| Pluracol 380 | 100.0 |
| Ethylene Glycol | 8.0 |
| UL-28 | 3.0 |
| T-9 | 3.0 |
| F-11B | 20.0 |

-continued

| Ingredient | Parts |
| --- | --- |
| Verona Red | 1.0 |
| Isocyanate (comprised of 103.0 parts Dipropylene glycol and 897.0 parts Hylene-W) | 42.6 per 100 parts of above resin mixture |

| Physical Test | Results |
| --- | --- |
| Tensile, psi | 406 |
| Elongation, % | 300 |
| Block Tear, ppi (no skin) | 7.0 |
| Block Tear, ppi (w/skin) | 11.5 |
| Compression Set, % | 85.0 |
| U.V. - 250 hours | 3 |
| Weatherometer - 250 hours | 3 |
| Fadeometer - 250 hours | 3 |

EXAMPLE 8

| Ingredient | Parts |
| --- | --- |
| Pluracol 380 | 100.0 |
| Ethylene Glycol | 8.0 |
| UL-28 | 3.0 |
| T-9 | 3.0 |
| F-11B | 20.0 |
| Verona Red | 1.0 |
| Isocyanate (comprised of 136.5 parts Dipropylene glycol and 863.5 parts Hylene-W) | 49.4 per 100 parts of above resin mixture |

| Physical Test | Results |
| --- | --- |
| Tensile, psi | 360 |
| Elongation, % | 450 |
| Block Tear, ppi (no skin) | 9.0 |
| Block Tear, ppi (w/skin) | 17.1 |
| Compression Set, % | 94.4 |
| U.V. - 250 hours | 3 |
| Weatherometer - 250 hours | 3 |
| Fadeometer - 250 hours | 3 |

With regard to the formulation set forth in Example 1 above, the following procedure is intended to be an illustrative example of one of the ways of practicing the method of the present invention:

A mixture of: 100 parts (0.04993 equivalents) of a polyoxypropylene-ethylene-polymer modified glycol, in this case Pluracol Polyol 581 from BSAF Wyandotte Corp.; 12 parts of ethylene glycol (0.38710 equivalents); 3 parts of stannous octoate, T-9 from M&T Chemical Corp.; 3 parts of dimethyltin dilaurate; UL-28 from Witco Chemical; 20 parts of trichloromonofluoromethane, F-11B of Du Pont Chemical Co.; 1 part of Tinuvin 328, an ultraviolet absorber from Ciba-Geigy Corp.; and 1 part of Irganox 1010, an antioxidant from Ciba-Geigy Corp., was prepared at room temperature.

To 100 parts of the polyol or resin mixture above (320 equivalent weight), 43.9 parts of Hylene-W, 4,4'-methylene-bis-cyclohexylisocyanate, from Du Pont Chemical Co. (equivalent weight of 132) was added with thorough agitation. Within about 20 seconds, the entire mixture was immediately poured into a mold at about 50° to 70° C. in which it spread and formed the integral skinned foam product.

After a short time of about 3 to 5 minutes, the part was demolded and allowed to age at room temperature for at least one hour before subjecting it to physical tests. There was no need to post cure at elevated temperatures.

The color stable integral skin foam of the present invention has as one of its principal advantages the fact that it can be formulated to meet a wide range of physical properties such as hardness, density, etc. Other advantages include the facts that the end product can be made to have a feel very similar to leather, and is lower in weight than PVC (polyvinyl chloride), CAB (cellulose acetate butyrate), or PP (polypropylene), its typical material competitors. From an equipment standpoint, the present invention can be made using low cost tooling, and equipment costs are lower than for injection molding.

As one of its most basic advantages, the present invention does away with the problems associated with painted foam products. Parts made using the present invention need not be painted to match colors, since the entire part is precolored. There are no problems with paint adhesion or paint wear in actual use due to abrasion or other effects of repeated handling. The parts offer excellent color stability and will not yellow or change color severely when exposed to ultraviolet or other visible radiation. In addition, since the formulations used in the present invention are relatively fast reacting compared to the prior art, they are easy to incorporate in commercial manufacturing processes, plus are economically attractive in other ways.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A color stable integral skin polyurethane foam prepared by reacting a composition comprising:
   (a) a polyol,
   (b) an isocyanate selected from the group consisting of aliphatic or cyclo-aliphatic isocyanates,
   (c) a crosslinker, and
   (d) a catalyst comprising stannous octoate and dimethyltin dilaurate.

2. A composition for use in preparing a color stable integral skin polyurethane foam comprising:
   (a) a polyol selected from the group consisting of polyether polyols,
   (b) an isocyanate selected from the group consisting of aliphatic or cyclo-aliphatic isocyanates,
   (c) a crosslinker selected from the group consisting of short chain polyols or polyamines, and
   (d) a catalyst comprising stannous octoate and dimethyltin dilaurate.

3. The invention of claim 2 wherein said composition further comprises a blowing agent.

4. The invention of claim 2 wherein said composition further comprises a pigment.

5. The invention of claim 2 wherein said composition further comprises an ultraviolet stabilizer.

6. The invention of claim 2 wherein said composition further comprises an anti-oxidant.

7. The invention of claim 2 wherein said composition further comprises an anti-ozonant.

8. The invention of claim 2 wherein,
   component (a) is present from about 40 to about 80 percent by weight of the composition, component (b) is present from about 10 to about 40 percent by weight of the composition,
component (c) is present from about 2 to about 10 percent by weight of the composition, and
component (d) is present from about 1 to about 5 percent by weight of the composition.

9. The invention of claim 2 wherein,
component (a) is present from about 50 to about 70 percent by weight of the composition,
component (b) is present from about 15 to about 35 percent by weight of the composition,
component (c) is present from about 3 to about 7 percent by weight of the composition, and
component (d) is present from about 2 to about 4 percent by weight of the composition.

10. The invention of claim 2 wherein,
component (a) is present from about 50 to about 60 percent by weight of the composition,
component (b) is present from about 20 to about 30 percent by weight of the composition,
component (c) is present from about 4 to about 6 percent by weight of the composition, and
component (d) is present from about 3 to about 4 percent by weight of the composition.

11. A composition for use in preparing a color stable integral skin polyurethane foam comprising:
(a) a polyol,
(b) an isocyanate selected from the group consisting of aliphatic or cyclo-aliphatic isocyanates,
(c) a crosslinker,
(d) a catalyst comprising stannous octoate and dimethyltin dilaurate,
(e) an ultraviolet stabilizer, and
(f) an anti-oxidant.

12. The invention of claim 11 wherein said composition further comprises a blowing agent.

13. The invention of claim 11 wherein said composition further comprises a pigment.

14. The invention of claim 11 wherein said composition further comprises an anti-ozonant.

15. The invention of claim 11 wherein,
component (a) is present from about 40 to about 80 percent by weight of the composition,
component (b) is present from about 10 to about 40 percent by weight of the composition,
component (c) is present from about 2 to about 10 percent by weight of the composition,
component (d) is present from about 1 to about 5 percent by weight of the composition,
component (e) is present from about 0.5 to about 3 percent by weight of the composition, and
component (f) is present from about 0.5 to about 3 percent by weight of the composition.

16. The invention of claim 11 wherein,
component (a) is present from about 50 to about 70 percent by weight of the composition,
component (b) is present from about 15 to about 35 percent by weight of the composition,
component (c) is present from about 3 to about 7 percent by weight of the composition,
component (d) is present from about 2 to about 4 percent by weight of the composition,
component (e) is present from about 1 to about 2 percent by weight of the composition, and
component (f) is present from about 1 to about 2 by weight of the composition.

17. The invention of claim 11 wherein,
component (a) is present from about 50 to about 60 percent by weight of the composition,
component (b) is present from about 20 to about 30 percent by weight of the composition,
component (c) is present from about 4 to about 6 percent by weight of the composition,
component (d) is present from about 3 to about 4 percent by weight of the composition,
component (e) is present from about 1 to about 2 percent by weight of the composition, and
component (f) is present from about 1 to about 2 percent by weight of the composition.

18. A composition for use in preparing a color stable integral skin polyurethane foam comprising:
(a) about 40 to about 80 percent by weight of a polyol selected from the group consisting of polyether polyols,
(b) about 10 to about 40 percent by weight of an isocyanate selected from the group consisting of aliphatic or cyclo-aliphatic isocyanates,
(c) about 2 to about 10 percent by weight of a crosslinker selected from the group consisting of short chain polyols or polyamines,
(d) about 1 to about 5 percent by weight of a catalyst comprising stannous octoate and dimethyltin dilaurate,
(e) about 0.5 to about 3 percent by weight of an ultraviolet stabilizer,
(f) about 0.5 to about 3 percent by weight of an anti-oxidant,
(g) about 5 to about 15 percent by weight of a blowing agent,
(h) about 1 to about 4 percent by weight of a pigment, and
(i) about 0.5 to about 3 percent by weight of an anti-ozonant.

19. The invention of claim 18 wherein,
component (a) is present from about 50 to about 70 percent by weight of the composition,
component (b) is present from about 15 to about 35 percent by weight of the composition,
component (c) is present from about 3 to about 7 percent by weight of the composition,
component (d) is present from about 2 to about 4 percent by weight of the composition,
component (e) is present from about 1 to about 2 percent by weight of the composition,
component (f) is present from about 1 to about 2 percent by weight of the composition,
component (g) is present from about 8 to about 13 percent by weight of the composition,
component (h) is present from about 2 to about 4 percent by weight of the composition, and
component (i) is present from about 1 to about 2 percent by weight of the composition.

20. The invention of claim 18 wherein,
component (a) is present from about 50 to about 60 percent by weight of the composition,
component (b) is present from about 20 to about 30 percent by weight of the composition,
component (c) is present from about 4 to about 6 percent by weight of the composition,
component (d) is present from about 3 to about 4 percent by weight of the composition,
component (e) is present from about 1 to about 2 percent by weight of the composition,
component (f) is present from about 1 to about 2 percent by weight of the composition, component (g) is present from about 9 to about 12 percent by weight of the composition, component (h) is present from about 2 to about 4 percent by weight of the composition, and component (i) is present from about 1 to about 2 percent by weight of the composition.

21. In the method of preparing an integral skin polyurethane foam comprising reacting a polyol, an aliphatic or cyclo-aliphatic isocyanate, a crosslinker, and a catalyst, the improvement comprising preparing a color stable integral skin urethane foam using a catalyst comprising stannous octoate and dimethyltin dilaurate.

22. A method of preparing a color stable integral skin urethane foam comprising the steps of:

preparing a composition comprising a mixture of:
(a) a polyol selected from the group consisting of polyether polyols,
(b) an isocyanate selected from the group consisting of aliphatic or cyclo-aliphatic isocyanates,
(c) a crosslinker selected from the group consisting of short chain polyols or polyamines, and
(d) a catalyst comprising stannous octoate and dimethyltin dilaurate, placing the composition in a mold, and
allowing the foam to cure.

23. The invention of claim 22 wherein said composition further comprises a blowing agent.

24. The invention of claim 22 wherein said composition further comprises a pigment.

25. The invention of claim 22 wherein said composition further comprises an ultraviolet stabilizer.

26. The invention of claim 22 wherein said composition further comprises an anti-oxidant.

27. The invention of claim 22 wherein said composition further comprises an anti-ozonant.

28. The invention of claim 22 wherein,
component (a) is present from about 40 to about 80 percent by weight of the composition,
component (b) is present from about 10 to about 40 by weight of the composition,
component (c) is present from about 2 to about 10 percent by weight of the composition, and
component (d) is present from about 1 to about 5 percent by weight of the composition.

29. The invention of claim 22 wherein,
component (a) is present from about 50 to about 70 percent by weight of the composition,
component (b) is present from about 15 to about 35 percent by weight of the composition,
component (c) is present from about 3 to about 7 percent by weight of the composition, and
component (d) is present from about 2 to about 4 percent by weight of the composition.

30. The invention of claim 22 wherein,
component (a) is present from about 50 to about 60 percent by weight of the composition,
component (b) is present from about 20 to about 30 percent by weight of the composition,
component (c) is present from about 4 to about 6 percent by weight of the composition, and
component (d) is present from about 3 to about 4 percent by weight of the composition.

31. A method of preparing a color stable integral skin urethane foam comprising the steps of:

preparing a composition comprising a mixture of:
(a) a polyol,
(b) an isocyanate selected from the group consisting of aliphatic or cyclo-aliphatic isocyanates
(c) a crosslinker
(d) a catalyst comprising stannous octoate and dimethyltin dilaurate
(e) an ultraviolet stabilizer, and
(f) an anti-oxidant, placing the composition in a mold, and
allowing the foam to cure.

32. A method of preparing a color stable integral skin urethane foam comprising the steps of:

preparing a composition comprising a mixture of:
(a) about 40 to about 80 percent by weight of a polyol selected from the group consisting of polyether polyols,
(b) about 10 to about 40 percent by weight of an isocyanate selected from the group consisting of aliphatic or cyclo-aliphatic isocyanates,
(c) about 2 to about 10 percent by weight of a crosslinker selected from the group consisting of short chain polyols or polyamines,
(d) about 1 to about 5 percent by weight of a catalyst comprising stannous octoate and dimethyltin dilaurate,
(e) about 0.5 to about 3 percent by weight of an ultraviolet stabilizer,
(f) about 0.5 to about 3 percent by weight of an anti-oxidant,
(g) about 5 to about 15 percent by weight of a blowing agent,
(h) about 1 to about 4 percent by weight of a pigment, and
(i) about 0.5 to about 3 percent by weight of an anti-ozonant, placing the composition in a mold, and
allowing the foam to cure.

33. The invention of claim 32 wherein,
component (a) is present from about 50 to about 70 percent by weight of the composition,
component (b) is present from about 15 to about 35 percent by weight of the composition,
component (c) is present from about 3 to about 7 percent by weight of the composition,
component (d) is present from about 2 to about 4 percent by weight of the composition,
component (e) is present from about 1 to about 2 percent by weight of the composition,
component (f) is present from about 1 to about 2 percent by weight of the composition,
component (g) is present from about 8 to about 13 percent by weight of the composition,
component (h) is present from about 2 to about 4 percent by weight of the composition, and
component (i) is present from about 1 to about 2 percent by weight of the composition.

34. The invention of claim 32 wherein,
component (a) is present from about 50 to about 60 percent by weight of the composition,
component (b) is present from about 20 to about 30 percent by weight of the composition,
component (c) is present from about 4 to about 6 percent by weight of the composition,
component (d) is present from about 3 to about 4 percent by weight of the composition,
component (e) is present from about 1 to about 2 percent by weight of the composition,
component (f) is present from about 1 to about 2 percent by weight of the composition,
component (g) is present from about 9 to about 12 percent by weight of the composition,
component (h) is present from about 2 to about 4 percent by weight of the composition, and
component (i) is present from about 1 to about 2 percent by weight of the composition.

* * * * *